US007895336B2

(12) United States Patent
Cameron et al.

(10) Patent No.: US 7,895,336 B2
(45) Date of Patent: Feb. 22, 2011

(54) MOBILE DECISION SUPPORT SYSTEM

(75) Inventors: Richard Neill Cameron, Le Rouret (FR); Loic Jaouen Feinbier, Le Cannet (FR); Michael Clayton Schmaltz, Biot (FR); Alexander Peter Van Den Hondel, Oldenzaal (NL)

(73) Assignee: Accenture Global Services Limited, Dublin (IE)

( * ) Notice: Subject to any disclaimer, the term of this patent is extended or adjusted under 35 U.S.C. 154(b) by 2259 days.

(21) Appl. No.: 10/094,373

(22) Filed: Mar. 8, 2002

(65) Prior Publication Data
US 2002/0129027 A1 Sep. 12, 2002

Related U.S. Application Data (60) Provisional application No. 60/274,978, filed on Mar. 12, 2001.

(51) Int. Cl.
*G06F 15/16* (2006.01)
(52) U.S. Cl. .................... 709/227; 709/203; 707/791
(58) Field of Classification Search ............ 455/450; 709/219, 218; 707/100–104.1, 1–10; 700/17, 700/83, 86; 711/100
See application file for complete search history.

(56) References Cited

U.S. PATENT DOCUMENTS

| 6,134,450 | A | 10/2000 | Nordeman |
| 6,405,034 | B1 | 6/2002 | Tijerino |
| 6,487,457 | B1 * | 11/2002 | Hull et al. ............. 700/17 |
| 6,731,724 | B2 * | 5/2004 | Wesemann et al. ...... 379/88.16 |
| 2002/0002598 | A1 * | 1/2002 | Van Allen et al. ......... 709/219 |
| 2002/0112114 | A1 * | 8/2002 | Blair et al. ............. 711/100 |
| 2003/0046291 | A1 * | 3/2003 | Fascenda ................ 707/10 |
| 2004/0043770 | A1 * | 3/2004 | Amit et al. ............. 455/450 |

OTHER PUBLICATIONS

Fasbender, A., Reicher, F., Geulen, E., Hjelm, J., "Any Network, Any Terminal, Anywhere," IEEE Personal Communications, IEEE Communications Society, US, vol. 6, pp. 22-30, Apr. 1999, XP000823965.

Meyer, M., Geulen, E., "The On-The-Move Concept for Mobile Middleware," ISS '97, World Telecommunications Congress (International Switching Symposium), Global Network Evolution: Convergence or Collision? Toronto, Ontario, Canada, Sep. 21-26, 1997, Toronto Pinnacle Group, CA, vol. 2, pp. 373-378, XP000704489.

* cited by examiner

*Primary Examiner*—Charles Rones
*Assistant Examiner*—Belix M Ortiz
(74) *Attorney, Agent, or Firm*—Brinks Hofer Gilson & Lione (57) ABSTRACT

A mobile decision support system for proactive decision support of an enterprise includes at least one server computer, at least one mobile communication device and at least one client system in operable communication over a network. The server computer includes a database. The client system may interface with the server computer and direct the configuration of hotspot information in the database. The hotspot information includes identification of a user, a response template and/or data. The mobile communication device may periodically request hotspot information from the server computer as a function of the user operating the mobile communication device. Based on the request, the hotspot information may be transmitted over the network to the mobile communication device. The user may generate a response to the hotspot information with the mobile communication device by selections within the response template. The response may be transmitted to recipients selected with the response template through reply channels also selected with the response template.

35 Claims, 4 Drawing Sheets

MOBILE DECISION SUPPORT SYSTEM

This application claims the benefit under 35 U.S.C. §119 (e) of Provisional U.S. Patent Application Ser. No. 60/274,978, filed on Mar. 12, 2001.

FIELD OF THE INVENTION

This invention relates to mobile communication devices and in particular, to mobile communication devices operating in a mobile decision support system.

BACKGROUND OF THE INVENTION

Business organizations commonly include multiple departments or business units. The departments may cooperatively operate to produce the product(s) of the business organization, as well as perform internal functions in support of the organization and products. The location of such departments may be geographically distributed, centrally located or some combination of both.

The ability to monitor operations and share information across such a business organization is a valuable tool. One way to perform this function is through the use of a network based computer system within the organization. Such a computer system may allow the storage and maintenance of information by individual departments. In addition, the computer system may allow sharing of information among all the departments within the organization. Typically, such a computer system includes a single integrated software program operating on one or more server computers with information stored in a database. Access to the database is typically by personal computers connected with the server computer via a network.

One such system is known as an enterprise resource planning (ERP) system. In general, ERP systems may be used to integrate all facets of a business enterprise. Integration of information relating to, for example, planning, manufacturing, sales and marketing may be performed by an ERP system. For example, when an order is taken for a widget, instead of flowing in paper form through the supply chain of the organization, the order may be input into an ERP system. The order may then be electronically routed through the organization while allowing all the departments to see the status of the order. In addition, the ERP system may allow departments to forecast production needs, determine resource availability, project financial results and provide other information related to operations. Typically, the operational information may be summarized and made available to users of the information within the different departments. The users may use such information to manage and make appropriate business decisions for the department as well as the organization.

In today's business climate, many users travel frequently or are otherwise away from personal computers connected with the network. As such, other individuals in the business organization may attempt to keep such a user informed of the status of ongoing operations through emails, two-way pager messages, faxed reports or verbal communications. Another way for a user who is traveling to access the operational information may be through remote access. Remote access may require a user to remotely connect to the network, login, and access the central database. Creating such a remote connection typically entails connecting a laptop computer with a phone line and dialing into the network. Once connected with the network, the user may analyze the information, generate reports, etc.

Constantly tracking the whereabouts of a traveling user to inform the user of ongoing operations is difficult. In addition, there may be times when the user is unreachable, or operational issues go unnoticed by others in the department responsible for keeping the user who is traveling appraised of ongoing operations. For traveling users relying on remote network access, a phone line to establish a remote connection to the network may be unavailable. In addition, such a user requires a laptop computer with appropriate software and hardware to form the remote connection and interface to the ERP. A user relying on remote login for access may also not be provided notice of significant changes in the information while not logged on to the network. Further, such a traveling user may be unable to quickly communicate valuable information back to the ERP. Increases in decision making time resulting from delayed transfer of operational information may result in significant costs and/or reduced performance for those business organizations dependent on information within the ERP and decisions by a user to maintain efficient operations.

BRIEF SUMMARY OF THE INVENTION

The present invention is defined by the following claims, and nothing in this section should be taken as a limitation on those claims. By way of introduction, the embodiments described below include a mobile decision support system for reducing time to decision and improving overall efficiency. The mobile decision support system uses hotspot information to provide an effective, versatile interaction channel for a business enterprise or any other organization. The hotspot information may represent issues, problems or events needing resolution. The hotspot information may be dynamically configured and forwarded to at least one decision making individual almost anywhere in the world. In addition, the hotspot information may be updated with a response from that individual and provided to selected recipients. Accordingly, the mobile decision support system may reduce time to decision and eliminate delay in the transfer of vital information to maximize performance and responsiveness of an organization.

The mobile decision support system includes at least one mobile communication device, at least one server and at least one client system communicatively coupled with a network. Hotspot information may be dynamically configured in a database associated with the server. Based upon requests generated with a mobile communication device operated by a user, hotspot information addressed to that user may be extracted from the database, packaged and transmitted over the network to the mobile communication device. The user may request display of the hotspot information on the mobile communication device for analysis and response.

A response may be generated by the user through selection of options within a response template included with the hotspot information. The options may include selection of recipients, selection of reply channels and selection of response information. The response may be dynamically configured as a function of selections in the response template and transmitted over the network to the to the server. Further configuration and updating of the hotspot information in the database may be performed based on the response. In addition, the response may be formatted for the selected reply channels and forwarded to the selected recipients.

An interesting feature of the mobile decision support system is with regard to an embodiment in which the mobile communication device is a wireless device operating with Java J2ME. In this embodiment, the mobile communication device generates requests as SQL queries that are translated by the server and executed against the database.

Another interesting feature involves configuration of the hotspot information by the client system. The client system may include a client administrator and/or an enterprise resource planning (ERP) system. The client administrator may manually configure hotspot information by accessing the database over the network using a browser. The ERP system may communicate with the server over the network to configure hotspot information and/or provide enterprise data based on accumulated enterprise data and key performance indicators. In addition, hotspot information updated with a response may be provided back to the ERP system.

These and other features and advantages will become apparent upon a review of the following detailed description of the presently preferred embodiments of the invention viewed in conjunction with the appended drawings.

DETAILED DESCRIPTION OF THE PREFERRED EMBODIMENTS

The presently preferred embodiments describe a system for supporting mobile decision-making using mobile communication devices. The system may be used within a business enterprise/organization, for example, to improve time to decision capability. High-speed wireless data networks may be utilized to maintain "always on" connectivity with users of mobile communication devices. The mobile communication devices may generate reoccurring requests for information for the user operating the mobile communication device. Information for an identified user may be transmitted to the mobile communication device along with selections available to formulate a response. Accordingly, the user may efficiently maintain communication, while effectively handling issues and problems in a more proactive manner to increase overall efficiency within the organization.

Figure 1:
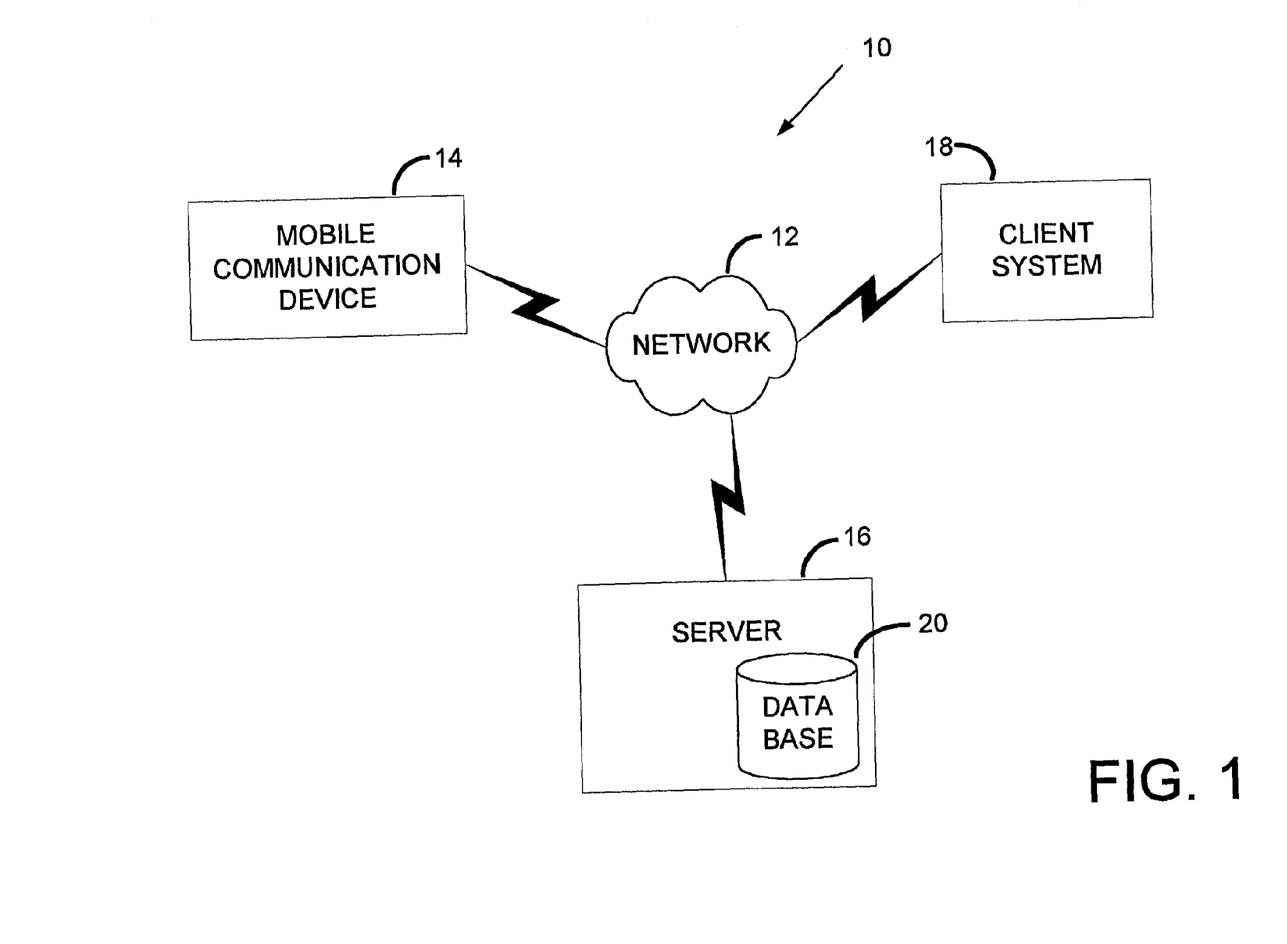
FIG. 1 is a block diagram of one embodiment of mobile decision support system.

FIG. 1 is a block diagram depicting an embodiment of a mobile decision support system 10. The mobile decision support system 10 includes, a network 12, at least one mobile communication device 14, at least one server 16 and at least one client system 18 operatively coupled as illustrated. The number and configuration of the devices coupled with the network 12 are merely an illustrative example, and should not be construed as a limitation on the almost unlimited possibilities for configuration of the mobile decision support system 10. For example, mobile communication device 14, server 16 and client system 18 may be a plurality of mobile communication devices 14, servers 16 and client systems 18 coupled by the network 12 to cooperatively perform various functionality related to the mobile decision support system 10. As used herein, the term "coupled" or "connected" may mean electrically linked, optically linked or any other form of association allowing the flow of data or some representation thereof between devices and components.

The network 12 may include the Internet, a public and/or private intranet, an extranet, and/or any other form of network configuration enabling transfer of data and commands. An exemplary network configuration uses the Transport Control Protocol/Internet Protocol ("TCP/IP") network protocol suite, however, other network protocols are contemplated. As referred to herein, the network 12 should be broadly construed to include any software application and hardware devices used to provide interconnected communication between devices and applications. For example, interconnection with the Internet may involve connection with a wireless service provider and/or an Internet service provider using, for example, modems, cable modems, ISDN connections and devices, DSL connections and devices, fiber optic connections and devices, satellite connections and devices, wireless connections and devices, Bluetooth connections and devices, or any other communication interface device. Similarly, intranets and extranets may include interconnections via software applications and various computing devices (network cards, cables, hubs, routers, etc.) that are used to interconnect various computing devices and provide a communication path.

Communication within the network 12 may be performed with a communication medium that includes wireline based communication systems and/or wireless based communication systems. The communication medium may be for example, a communication channel, radio waves, microwave, wire transmissions, fiber optic transmissions, or any other communication medium capable of transmitting data.

The mobile communication device 14 may be any device used by a user for communication over the network 12. Although only a single mobile communication device 14 is illustrated in FIG. 1, any number of mobile communication devices 14 may be coupled with the network 12. The mobile communication device 14 includes resources such as, for example, memory, data storage, computing capabilities, user interface capabilities, etc. to provide communication and associated functionality. Exemplary mobile communication devices 14 include wireless telephones, personal digital assistants (PDAs), pagers or any other mobile computing device capable of sending and/or receiving information over the network 12.

In the presently preferred embodiments, the mobile communication device 14 is a wireless communication device, such as, for example, a wireless phone. In this embodiment, the mobile communication device 14 communicates over the network 12 via a telecom gateway (not shown). The telecom gateway is a well-known device that may include an antenna for wireless communication with wireless devices. The telecom gateway also preferably includes an interconnection to the remainder of the network 12.

Wireless communication between the telecom gateway and the mobile communication device 14 preferably utilizes general packet radio service (GPRS) or other similar packet based communication protocol. Such a packet-based protocol provides a mechanism for billing based on packets instead of airtime billing as in some existing wireless protocols. Accordingly, always on functionality may be more economically feasible when the airtime fees associated with some conventional wireless communication protocols may be avoided. In addition, through the use of always on technology, users of mobile communication devices 14 may remain constantly connected and logged in via the network 12 without the burden of time-consuming connection reestablishment. In other embodiments, however, global system mobile communication (GSM) data or other wireless airtime based systems may be utilized for communication with the mobile communication device 14 over the network 12. In the presently preferred embodiments, the mobile communication device 14 interfaces with the server 16 over the network 12.

The server 16 may be one or more computers or similar devices in communication with the mobile communication device 14 via the network 12. In the illustrated embodiment, the server 16 includes a database 20. The database 20 may be a central database, a distributed database or multiple databases in operable communication via the network 12. In other embodiments, additional server computers 16 and/or databases 20 may be included in the mobile decision support system 10. The server 16 may operate with an operating system such as, for example, Windows NT™, Windows 2000™, Linux™, MacOS™, proprietary operating systems or any other operating system providing server functionality. In one embodiment, the server 16 is a webserver operating with Microsoft™ Internet Information Server (ISS) running on a Windows XP™ operating system.

The operating system may also include applications that store, maintain and allow interface to data within the database 20. Applications, such as, for example, a database management system (DBMS) or other similar application may organize and coordinate the storage and retrieval of records containing data from the database 20. Exemplary DBMS systems include Microsoft™ Access or Microsoft™ SQL Server. The database 20 may be stored in a storage device, such as, for example, at least one hard drive, an optical storage media, and/or any other data storage device allowing read/write access to the data. The data within the database 20 may be stored in one centralized physical location or may be distributed among multiple physical locations within the network 12.

The client system 18, may be a computer system, a mainframe system or any other system or device capable of interfacing with the server 16 over the network 12. The interface provides a communication path to configure, view, manipulate, add and delete records within the database 20. The client system 18 may provide both manual and automated configuration of the records within the database 20. Manual configuration may include, for example, pre-configured screens, selection lists, check boxes or any other mechanisms for configuring the data and/or records within the database 20. Automated configuration may include dynamic configuration of hotspot information based on previously identified parameters.

The records within the database 20 may be referred to as "hotspots" or "hotspot information." As used herein, the term "hotspot" or "hotspot information" refers to information pertaining to an issue, problem or any other significant event. The issue, problem or event may be related to, for example, operation of an enterprise or other form of business organization. As used herein, the terms "business organization" and "enterprise" may refer to any group united in a relationship having common interests, activities or purposes.

The hotspot information may include a message indicative of the problem, issue and/or event. The message may be audio, video, text and/or any other communicative medium. In the presently preferred embodiments, the message is a text message. In addition, the hotspot information may selectively include identification of at least one intended recipient, data related to the problem issue or event, and a response template. The intended recipients are those users of mobile communication devices 14 to which the hotspot information is directed. The data may be summary reports, operational data, financial data or any other facts and/or information associated with the problem, issue or event.

The response template provides selections for a user formulating a response to the hotspot information. The response template may include a list for selection of recipients of the response, a list of possible reply channels to transmit the response and response information. The selection of recipients may include other users of mobile communication devices 14, the client system 18 or any other systems, entities or individuals. Any of a plurality reply channels may be selectable for each of the recipients. The reply channels may include, for example, email, fax, instant messaging, video conferencing access, telephone numbers, pager numbers or any other addressing for communication with the recipients. The response information may include a list of selectable response information addressing the issue, problem or event identified in the hotspot information.

Through selectable configuration of a response with the response template, significant data entry with the mobile communication device 14 may be avoided and responses may be dynamically created relatively quickly. In addition, desirable responses to the hotspot information may be provided to the user via the template to avoid miscommunication. Further, recipients of the response, and channels of communication to transmit the response, may be identified within the template to avoid the use of address books and/or other contact listings by the user. Accordingly, use of the response template not only expedites the response process, but may also provide devices with limited user interface, computing and memory capabilities, such as wireless phones, adequate resources to format a complete response.

During operation, the client system 18 may communicate with the server 16 to configure hotspot information within the database 20 for a user. For example, if a shipment of widgets to Customer X was delayed, hotspot information may be configured. In this example, the hotspot information may be addressed to a user of a mobile communication device 14 responsible for maintaining delivery schedules. The client system 18 may also configure the response template within the hotspot information. The response template may, for example, include recipients in shipping and receiving, customers, manufacturing units within the enterprise, material suppliers or any other recipients associated with correcting the late shipment issue.

The mobile communication device 14 may also communicate a request to the server 16 over the network 12. The request is a reoccurring message generated by the mobile communication device 14 based on a user currently operating the mobile communication device 14. The request may include a query to pull information from the server 16 based on identification of the user. Identification of the user may be obtained with login information provided to the mobile communication device 14. Login information may include a user ID, a user name, a login password, a biological scanner and/or any other similar mechanism to authenticate and obtain the identification of the user. For example, the login information may identify the user responsible for maintaining delivery schedules. In addition, where multiple databases are available, identification of the database 20 from which the information should be extracted may also be included in the request.

When the server 16 receives a request, the request is used to access the database 20 and identify hotspot information addressed to the user of the mobile communication device 14 generating the request. For example, the hotspot information regarding the late delivery schedule would be identified within the database 20 by a request from the user responsible for maintaining delivery schedules. The server 16 may transmit the identified hotspot information to the mobile communication device 14.

The user may selectively access the hotspot information and dynamically generate a response. The response may be generated by selectively configuring the response template included with the hotspot information. In addition, additional data may be added to the response or the hotspot information may be edited or modified by the user. When the response is complete, the user may direct transmittal of the response to the server 16. The response may be used to further configure the hotspot information by updating the corresponding record in the database 20. The response may then be formatted based on the reply channels selected and transmitted to the selected recipients on the selected reply channels. For example, the response from the user responsible for maintaining delivery schedules may be directed to the shipping department, the customer relations department and the widget manufacturing department of the enterprise.

The illustrated embodiments of the mobile decision support system 10 provide a pocket decision support system for user-to-enterprise transactions. Through use of the mobile decision support system 10, an enterprise may dramatically cut the time to decision by allowing integrated execution of actions by a user anytime and anywhere. In addition, users in such decision-making positions may be kept constantly informed with up to date information of changing business conditions as the conditions occur. The mobile decision support system 10 represents a new interaction channel that may be utilized by enterprises, customers and suppliers to streamline and otherwise improve productivity and efficiency.

Figure 2:
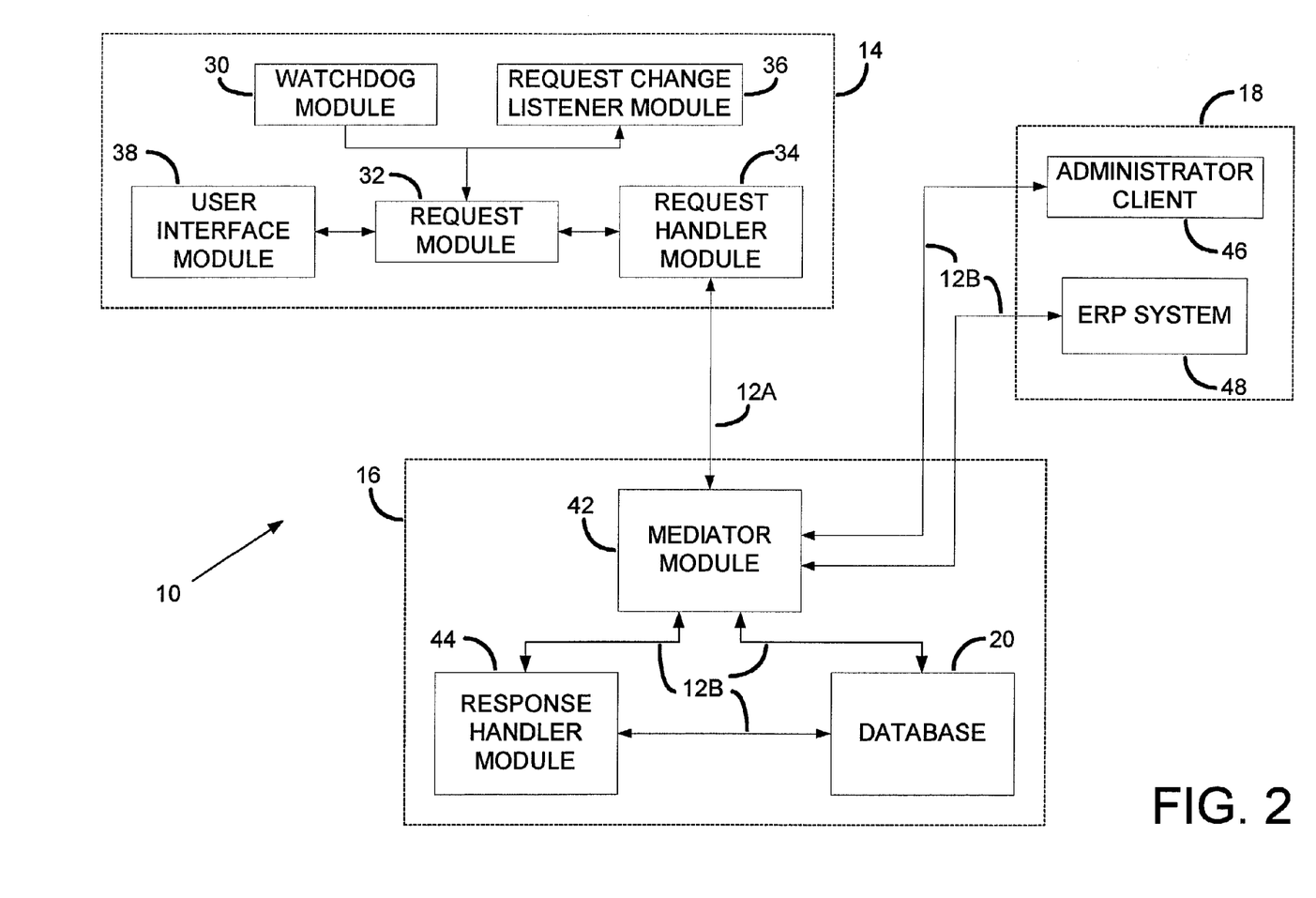
FIG. 2 is a more detailed block diagram of an embodiment of a mobile decision support system similar to the system illustrated in FIG. 1.

FIG. 2 is a more detailed block diagram depicting an embodiment of the mobile decision support system 10. Similar to FIG. 1, the mobile decision support system 10 includes at least one mobile communication device 14, at least one server 16 and at least one client system 18 communicating over the network 12.

In the illustrated embodiment, the network 12 includes a first network 12*a* and a second network 12*b*. The first network 12*a* provides a communication link between the mobile communication device 14 and the server 16 as illustrated. The mobile communication device 14 of this embodiment is preferably a wireless device communicating over the first network 12*a* with at least one wireless communication channel. In addition, the first network 12*a* may include communication over the Internet. Accordingly, communications between the mobile communication device 14 and the server 16 may occur over a wireless communication network and the Internet. The second network 12*b* may include the Internet. In other embodiments, extranets, intranets, and any other portion of the previously discussed network 12 may also be included in the first and second networks 12*a*, 12*b*.

As illustrated in FIG. 2, the mobile communication device 14 includes a watchdog module 30, a request module 32, a request handler module 34, a request change listener interface 36 and a user interface module 38 cooperatively operating as illustrated. The illustrated modules are provided to organize the functionality of the mobile communication device 14. Fewer or greater numbers of modules may be used to illustrate similar functionality.

In the presently preferred embodiments, the modules represent Java classes operating in a wireless communication device that supports Java technology. Java technology includes a Java programming language operating on a Java Virtual Machine. For example, mobile communication device 14 may include Java KVM operating with Java 2 Platform, Micro Edition (J2ME). The J2ME platform is specifically tailored to comply with the memory and processing power constraints of devices such as wireless phones, PDAs and two-way pagers. In other embodiments, other device platforms, as well as other programming languages/technologies, such as, for example, C, C++, Microsoft™ C sharp (C##) and/or any other technologies may be used with the mobile communication device 14.

The J2ME platform operating in the mobile communication device 14 may include two layers, namely, a Connected Limited Device Configuration (CLDC) layer and a Profile layer. The CLDC layer specifies basic communication protocols, such as, for example hypertext transfer protocol (HTTP). The profile layer provides user interface and device specific functionality for a specific group of target devices. The J2ME profile for wireless phones, PDAs and 2-way pagers may be referred to as Mobile Interconnected Device Profile (MIDP). In addition to J2ME, other variations of J2ME may also be utilized in the mobile communication device 14. For example, NTT DoCoMo's iAppli specification incorporates the CLDC layer from J2ME, and replaces the MIDP layer with a proprietary layer providing a profile for wireless phones.

In one embodiment, the modules included within each mobile communication device 14 may include sufficiently generalized functionality for use by any user in an organization. In other embodiments, the modules may be customized for different individual users and/or groups of users to provide tailored functionality. The modules may be stored in the mobile communications device 14 and selectively activated based on login information provided by a user. Alternatively, a user operating the mobile communication device 14 may download the modules, or portions of the modules from elsewhere on the network 12. In one embodiment, modules with differing functionality may be downloaded based on the login information of the user operating the mobile communication device 14.

The watchdog module 30 may operate to originate the preparation of a request by the mobile communications device 14 at specified intervals. In other embodiments, other triggers, such as, for example an external signal, a user initiated signal or any other action may operate to originate preparation of a request. The watchdog module 30 of one embodiment includes a timer function such that a time period (for example five minutes) may be specified as the interval between generation of requests.

As previously discussed, utilization of GPRS or other similar packet-based wireless communication protocol further enhances operation by avoiding the need to continuously re-establish a connection when the preparation of a request is originated. In embodiments where a non-packet based protocol is utilized, the watchdog module 30 may also re-establish connection with the network 12 as part of the origination process. Operation of the watchdog module 30 preferably occurs continuously in the background while the mobile communication device 14 is operating. At the conclusion of the specified interval, the watchdog module 30 of one embodiment initiates the generation of a request.

The request module 32 may operate to generate a request. In one embodiment, the request is instantiated when the watchdog module 30 initiates generation of the request. In this embodiment, for each request initiated, a separate independent request is instantiated. The request may be generated in any format compatible with the server 16. The requests generated by one embodiment of the request module 32 are formatted in a structured query language (SQL) format. In this embodiment, the request module encapsulates a plain text SQL request string with HTTP to generate the request. In other embodiments, the request may include other formats such as, for example, unformatted text, Hypertext Markup Language (HTML), Extensible Markup Language (XML), Website Meta Language (WML), Directory Service Markup Language (DSML), proprietary languages such as, Microsoft™ Word and/or any other language.

Storage of hotspot information received over the network 12 may also be included in the functionality of one embodiment of the request module 32. In this embodiment, availability of network 12 does not affect the ability to access and respond to previously stored hotspot information. In other embodiments, other modules within the mobile communication device 14 may provide functionality to store hotspot information. The request module 32 of yet another embodiment may also include functionality to monitor the status of a request (e.g. has the request been fulfilled) as well error checking and any other analysis related to hotspot information and requests.

Requests generated by the request module 32 may be buffered and sent over the network 12 by the request handler module 34. The request handler module 34 may operate as an intermediary between the requests generated by the request module 32 and the network 12. In one embodiment, the request module 34 instantiates a request handler for each request generated. The list of instantiated request handlers may be buffered and corresponding requests may be transmitted over the network 12. Transmission over the network 12 may include wireless transmission and Internet transmission from a mobile communication device 14 that is a wireless device. In one embodiment, the request may be transmitted as an HTTP request preferably in SQL format. In other embodiments, other/additional protocols may be utilized such as, for example, Telnet, POP3, Multipurpose Internet mail extension (MIME), secure HTTP (S-HTTP), point-to-point protocol (PPP), TCP/IP, simple mail transfer protocol (SMTP), proprietary protocols, or any other network protocols known in the art.

The request module 32 of one embodiment may buffer requests while communication over the network 12 is unavailable. When communication over the network 12 is reestablished, the request handler module 34 of this embodiment may transmit the requests to the server 16. In other embodiments, buffering when the network 12 is unavailable may be provided by the request handler module 34, or any other module in the mobile communication device 14. Requests may be transmitted in sequence of generation order, a priority sequence established by the user, or any other sequence.

The request change listener interface 36 may operate to monitor for hotspot information transmitted in reply to a request. Other modules, such as, for example, the watchdog module 30, may implement (or support) the functionality of the request change listener interface 36. In one embodiment, the request change listener interface 36 allows asynchronous networking of the mobile communication device 14. In this embodiment, monitoring by the request change listener interface 36 occurs in the background to allow the mobile communication device 14 to perform other processing while awaiting a reply to a transmitted request. The request change listener interface 36 may receive and analyze the hotspot information received in reply to a request.

The user interface module 38 may provide for interaction with the user interface of the mobile communication device 14 to access and manipulate the hotspot information. In addition, the user interface module 38 may perform analysis and further processing of hotspot information as well as provide other functionality pertaining to operation of the mobile communication device 14. For example, the user interface module 38 may provide, soft buttons, displays, popup windows, etc., for a graphical user interface (GUI) of mobile communication device 14. The hotspot information received by the mobile communication device 14 may be processed by the user interface module 38 to enable the user interface. For example, initiation of an alarm upon receipt of hotspot information, generation of particular displays, enablement of particular buttons/touch screen functions, video conferencing capability or any other user interface functionality may be enabled based on the hotspot information.

In one embodiment, the user interface module 38 generates a display in the form of a world map on the GUI of a mobile communication device 14. Within the world map, different geographical locations may be identified. For example, in the case of a global enterprise, each facility of the enterprise may be geographically identified on the map. In this embodiment, the hotspot information is associated with one or more of the locations displayed in the map. As such, hotspot information received for different locations may be indicated geographically on the different areas of the map. Upon selection of a location, detailed hotspot information may be provided on the GUI, and user interface functions may be enabled to allow analysis and response by the user. In other embodiments, other presentation formats, such as, for example, categorical listings, enterprise hierarchy depiction or any other form of visual and/or audio presentation may be utilized to present hotspot information received by a mobile communication device 14.

As further illustrated in FIG. 2, the server 16 includes the database 20 as in the previous embodiments. In addition, the server 16 of this embodiment includes a mediator module 42 and a response handler module 44. In other embodiments additional or fewer modules may be depicted to illustrate the functionality of the server 16 within the mobile decision support system 10. The mediator module 42, the response handler module 44 and the database 20 of this embodiment are illustrated as operating within separate servers 16 in operable communication over the second network 12b. In other embodiments, different server and network configurations/components may be utilized to maintain operable communication within the server 16.

The mediator module 42 provides a communication interface between the database 20 and the other devices distributed within the network 12. In the illustrated embodiment, the mediator module 42 may provide access to the database 20 by a mobile communication device 14 over the first network 12a and access by the client system 18 over the second network 12b.

For example, where the mobile communication device 14 communicates over the first network 12a with a wireless communication channel and the Internet, the mediator module 42 may allow access to the database 20 via a request transmitted over the network 12 with an HTTP protocol. If for example, the request is made using an SQL query, the mediator module 42 may execute the request against the database 20. In this example, the database 20 is preferably an SQL database, however, other database formats are possible. Any resulting hotspot information may be packaged by the mediator module 42, and transmitted to the mobile communication device 14 using the same HTTP protocol. In addition, where the client system 18 communicates over the second network 12b via the Internet, for example, protocols such as, for example, Telnet, POP3, MIME, HTTP, HTTPS, PPP, TCP/IP, SMTP, proprietary protocols, or any other protocols known in the art may be utilized.

In the presently preferred embodiments, the mediator module 42 is an active server page (ASP) operating on the server 16 to mediate between incoming requests from the mobile communication device 14 and the database 20. In other embodiments, the mediator module 42 may be a Java server page running on Apache Webserver software or the like, a Java Servlet or any other type of server page. The mediator module 42 provides translation of requests from the mobile communication device 14 into a format compatible with the database 20. In one embodiment, where the mediator module 42 and the database 20 operate on separate servers, requests in the form of SQL queries transmitted via HTTP protocol may be translated by the mediator module 42. The translated requests may be provided to the database 20 over the second network 12*b* using, for example, Java database connectivity (JDBC). In other embodiments, where the mediator module 42 and the database 20 operate on the same server 16, requests may be executed directly by the mediator module 42 against the database 20 following translation.

The database 20 provides a result set based on the request. The result set is the hotspot information previously configured in the database 20. The result set may be packaged by the mediator module 42 and transmitted to the mobile communication device 14 over the first network 12*a*.

Responses to the hotspot information from the mobile communication device 14 are also received by the mediator module 42 over the first network 12*a*. In one embodiment, the responses are in the form of SQL transmitted with an HTTP protocol. In other embodiments, the responses may include any language, such as, for example, unformatted text, HTML, XML, etc. encapsulated with any protocol such as, for example, Telnet, POP3, MIME, TCP/IP, proprietary protocols etc. As previously discussed, the responses may be configured from the response template included with the hotspot information. The mediator module 42 may translate the response and further configure the hotspot information in the database 20 based on the translated response. The hotspot information configured with the information in the response may be utilized by the response handler module 44.

The response handler module 44 may continuously review the hotspot information in the database 20 for open responses. Those responses configured in the database 20 that have not yet been transmitted to recipients selected to receive the response are considered open responses. Open responses may be indicated in the database 20 by records with selected fields filled in, by records with selected empty fields, by a flag associated with the record, or any other mechanism for indicating a response. In one embodiment, fields within a record are populated with a time stamp to indicate transmittal of a response to recipients. The response handler module 44 may extract the details of the response from the database 20 and format a response message. The details extracted may include the selected recipients, the corresponding selected reply channel and the response information.

The format of the response may be based on the reply channel selected. For example, selection of a reply channel of email, facsimile or instant message, indicates a corresponding message format. The response handler module 44 may use well known transmission mechanisms, for example, Microsoft Outlook™, Micosoft Winfax™ and AOL™ instant messaging for transmission of such properly formatted responses on the selected reply channels.

In one embodiment, the response handler module 44 may generate new hotspot information when the mobile decision support system 10 is selected as the reply channel. In this embodiment, hotspot information is configured in the database 20 for the selected recipient of the response. Configuration of the hotspot information by the response handler 44 of one embodiment involves direct database manipulation via the mediator module 42 using SQL in an HTTP protocol. In other embodiments, any language, such as, for example, unformatted text, HTML, XML, etc. may be encapsulated with any protocol, such as, for example, Telnet, POP3, MIME, TCP/IP, proprietary protocols, etc. Accordingly, when the mobile communication device 14 operated by the selected recipient makes a request, the response is transmitted as hotspot information.

Referring again to FIG. 2, the client system 18 of this embodiment includes at least one administrator client 46 and at least one enterprise resource planning (ERP) system 48. The administrator client 46 and the ERP system 48 are coupled with the server 16 by the second network 12*b* and may include communication over the Internet. In other embodiments, other previously discussed components of the network 12 may be utilized for communication over the second network 12*b*.

The administrator client 46 may be a computer or any other device capable of establishing a communication link with the server 16 over the second network 12*b*. In one embodiment, a browser application operating on the administrator client 46 may be used to establish an interface with the server 16. The browser application may be, for example, Microsoft™ Internet Explorer or Netscape Navigator™. In other embodiments, other forms of interface are implemented such as, for example, dial up access, proprietary browser applications, or any other form of interface with server 16. The interface is preferably secure, requiring a user operating the administrator client 46 to register, or login, for access to the server 16. In the presently preferred embodiments, a Java application on the server 16 may be instantiated with the browser application on the administrator client 46. In this embodiment, an applet running in the browser application is utilized to avoid configuration of the administrator client 46 prior to accessing the server 16. For example, where the second network 12*b* is the Internet, a URL may be entered in the browser of the administrator client 46 to initiate interfacing with the server 16.

The interface with the server 16 allows the administrator client 46 to configure hotspot information within the database 20. In one embodiment configuring hotspot information with the administrator client 46 involves direct database manipulation via the mediator module 42 using SQL in an HTTP protocol. In other embodiments, any language, such as, for example, unformatted text, HTML, XML, etc. may be encapsulated with any protocol, such as, for example, Telnet, POP3, MIME, TCP/IP, proprietary protocols, etc.

Configuration of the hotspot information may include setting up the response template and the data retrieved, as well as triggers identifying when a hotspot will be created within the database 20. For example, a user may set up the generation of self-directed hotspots based on key performance indicators. Similarly, a business organization may identify triggers based on operational parameters that warrant transmittal of hotspots to users within the organization. Configuration of hotspot information may be provided by a selection screen accessible with the browser application. In one embodiment, a first, second and third selection screen are available. In other embodiments, fewer or greater numbers of selection screens may be provided.

The first selection screen of one embodiment may be configured for entry of details related to the hotspot. The details may include identification of users of mobile communication devices 14, a subject, geographical locations within an enterprise related to the hotspot information and a message identifying the issue, problem or event. In addition, data or other information may be included relating to the issue, problem or event that may be useful in formulating a response.

The second selection screen of one embodiment may provide configuration of a portion of the response template.

Selection of contact information for potential recipients of a response may be performed with the second selection screen. The contact information may include the user names of recipients, reply channels for recipients, phone numbers, fax numbers, email addresses, video conferencing addresses, instant messaging addresses, mailing addresses and/or any other contact information related to the possible recipients of a response.

The third selection screen of one embodiment may be an action screen in which possible responses to the hotspot information may be provided as part of the response template. Possible responses may include a message, an executable file to initiate a chain of events and/or any other form of response appropriate for the hotspot information.

The ERP system 48 may be any supply chain, business management, enterprise management and/or workflow system allowing consolidation and sharing of data and information among different users/departments/business units. ERP systems are well-known computer based systems utilizing a database to accumulate and analyze data across a large business organization, enterprise or group. An exemplary application is an ERP system 48 operating to accumulate and analyze enterprise data related to operations, finances, sales and human resources for a multinational business organization with operating facilities worldwide. In the illustrated embodiments, the ERP system 48 may be communicatively coupled with the server 16. The ERP system 48 of other embodiments may also be coupled with other ERP systems and/or any other systems related to mobile decision making with the mobile decision support system 10.

In one embodiment, the ERP system 48 may include functionality to configure hotspot information in the database 20 based on predetermined triggers. The triggers may be key performance indicators (KPIs) tied to performance of a user, performance of an operation or any other enterprise-related parameters accumulated and/or analyzed by the ERP system 48. In another embodiment, the ERP system 48 is monitored by the server 16. In this embodiment, triggers may be configured in the server 16. The triggers initiate the configuration of hotspot information in the database 20 by the server 16. In addition, the server 16 may also retrieve relevant accumulated data from the database(s) of the ERP system 48 based on triggers.

Communication between the ERP system 48 and the database 20 of one embodiment includes direct database manipulation via the mediator module 42 with SQL in an HTTP protocol. In other embodiments, any other language, such as, for example, unformatted text, HTML, XML, etc. may be encapsulated with any protocol, such as, for example, Telnet, POP3, MIME, TCP/IP, etc.

Hotspot information configured in the database 20 may be logically configured and tailored to the needs of the user to which the hotspot information is addressed. For example, hotspot information relating to a potentially late shipment of widgets may be pre-configured to include shipping schedules, production schedules and other information upon which to base a decision. As previously discussed, configuration within the database of hotspot information may occur with the ERP system 48, the server 16 and/or the administrator client 46.

The ERP system 48 of another embodiment may also include the ability to receive responses from the response handler module 44. In this embodiment, the response handler module 44 may format responses such that the ERP system 48 may extract and make the data content of the response available within the ERP system 48. In still other embodiments, response data may be provided to the ERP system 48 by the server 16 and/or any other mechanism within the mobile decision support system 10.

Figure 3:
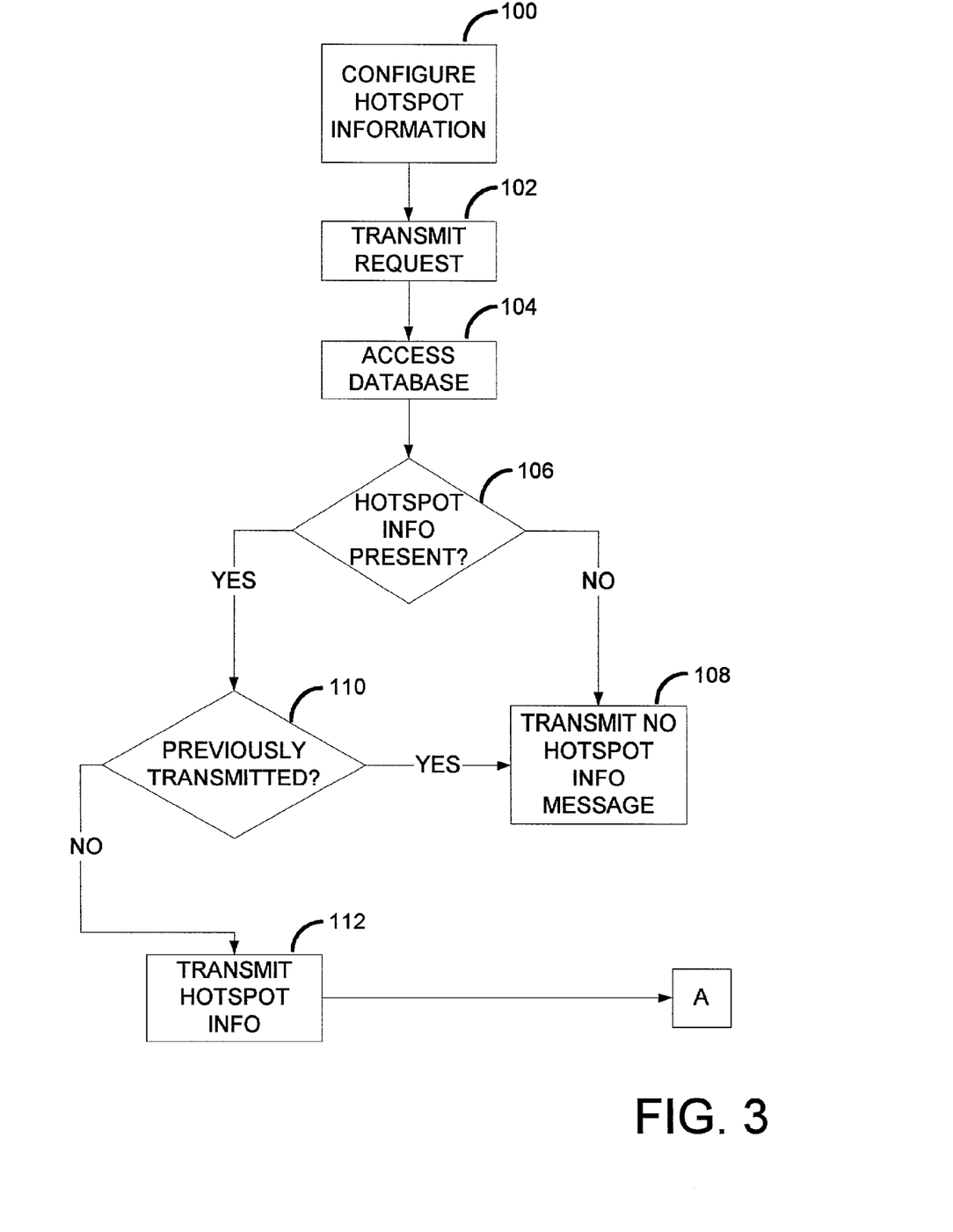
FIG. 3 is a process flow diagram illustrating operation of one embodiment of the mobile decision support system illustrated in FIG. 2.

FIG. 3 is a flow diagram illustrating exemplary operation of the embodiment of the mobile decision support system 10 illustrated in FIG. 2. The operation begins at block 100 when hotspot information is configured in the database 20. At block 102, a mobile communication device 14 transmits a request to the server 16 over the network 12. The mediator module 42 translates the request and accesses the database 20 at block 104. At block 106, the translated request is used to check the database 20 for the presence of hotspot information addressed to the user of the mobile communication device 14 generating the request.

If no hotspot information has been configured in the database 20 for the user making the request, the mediator module 42 replies to the mobile communication device 14 with a message indicating no hotspot information at block 108. If hotspot information has been configured in the database 20 for the user making the request, the identified hotspot information is checked for previous transmission to the mobile communication device 14 at block 110. If the identified hotspot information was previously transmitted, the mediator module 42 replies to the request with a no hotspot information message at block 108. If, however, the hotspot information was not previously transmitted, the mediator module 16 transmits the identified hotspot information to the mobile communication device 14 at block 112.

Figure 4:
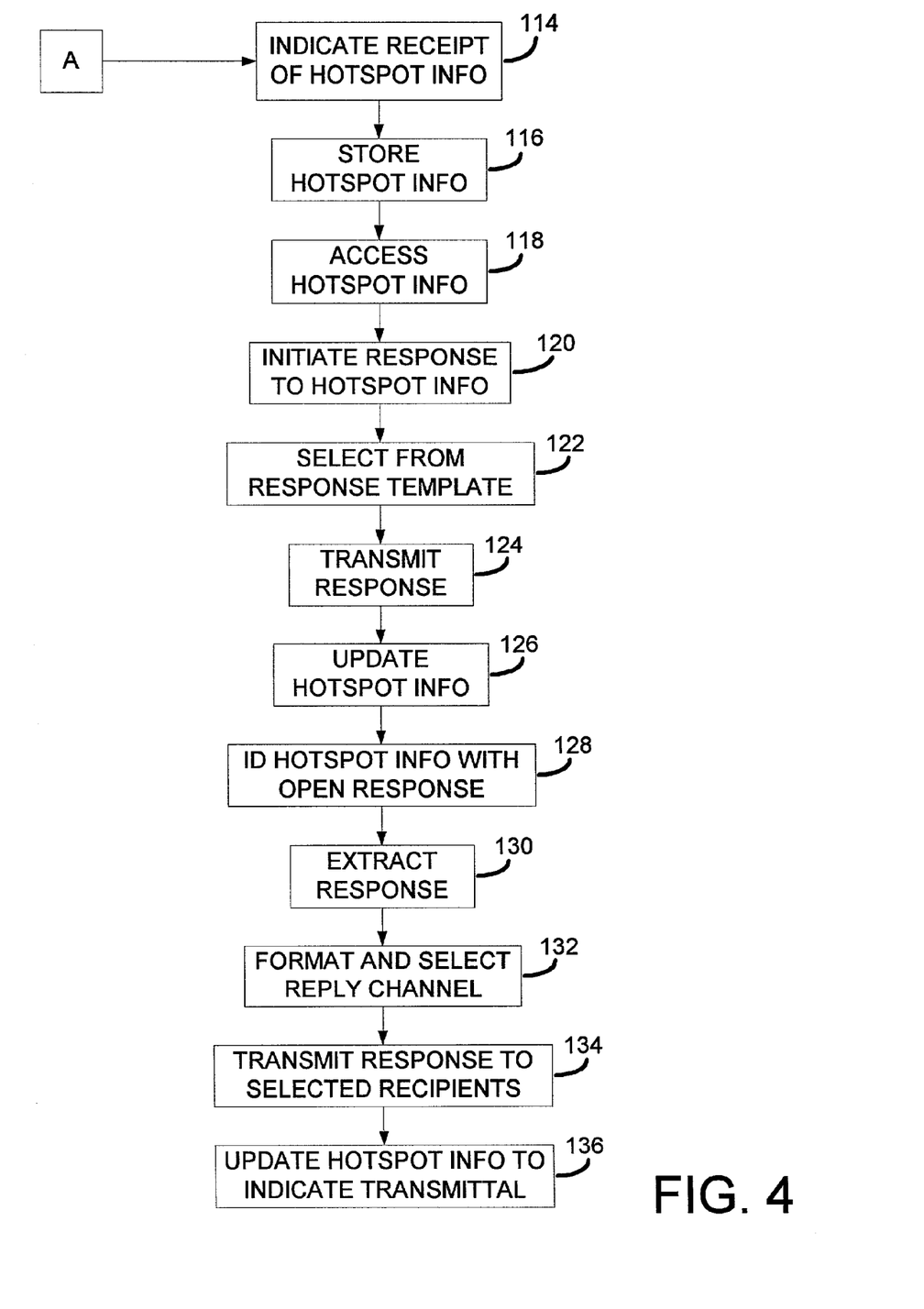
FIG. 4 is a second part of the process flow diagram of FIG. 3.

Referring now to FIG. 4, at block 114, indication of receipt of hotspot information is provided to the user by the mobile communication device 14. The hotspot information may be processed and stored in the mobile communication device 14 at block 116. At block 118, the user may selectively access the hotspot information. The user may elect to initiate a response to the hotspot information at block 120. At block 122, the user may select from the response template included in the hotspot information to formulate the response. In addition, data may be added to the response or the hotspot information may be edited or modified by the user. When the response is complete, the user directs transmittal of the response to the server 16 at block 124. At block 126, the mediator module 42 updates the configuration of the corresponding hotspot information record in the database 20 based on the response. The hotspot information is identified as having an open response at block 128. At block 130, the response handler module 4-44 extracts the response from the database 20. The response is formatted for the reply channels selected in the response at block 132. At block 134, the response is transmitted to the selected recipients on the selected reply channels. The hotspot information in the database 20 is updated to reflect transmittal to each of the recipients at block 136.

The previously described embodiments of the mobile decision support system 10 provide a proactive decision support system for an enterprise or business organization. The mobile decision support system 10 may provide a new type of "mcommerce" (mobile e-commerce) for employee to enterprise (E2E) transactions. Providing hotspot information related to an issue, problem or event on a mobile communication device 14 with "always on" capability may allow global decision makers to quickly and efficiently make critical decisions from almost any location in the world. In addition, sufficient pertinent information may be provided on which to base such a decision. Further, even with a mobile communication device 14 with limited user interface capabilities critical decisions may be quickly and efficiently communicated to any number of recipients using the response template.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

What is claimed is:

1. A method of mobile decision making, the method comprising:
   configuring hotspot information in a database, the hotspot information representative of an issue, problem or event and comprising identification of a specific user the hotspot information is for, a response template tailored for use by the identified specific user to formulate a response to the hotspot information, and data;
   checking the database for hotspot information as a function of a request generated by a mobile communication device, the request comprising identification of the user the hotspot information is specified for;
   transmitting the hotspot information over a network to the mobile communication device that generated the request as a function of the user identified in the request; and
   receiving a response to the hotspot information from the mobile communication device, wherein the response includes indication of a recipient, other than the user, that the response is to be transmitted to, and indication of a reply channel to transmit the response to the recipient, both of which were provided in the response template and were selectable by the user.

2. The method of claim 1, further comprising with the mobile communication device, the user selecting from the response template to configure a response to the hotspot information, the selection comprising identification of the recipient of the response, selection of the reply channel for the response and selection of response information.

3. The method of claim 1, further comprising:
   indicating the receipt of hotspot information with the mobile communication device; and
   accessing the hotspot information with the mobile communication device.

4. The method of claim 1, further comprising:
   configuring the hotspot information in the database as a function of the received response;
   formatting the received response as a function of the reply channel indicated in the response; and
   transmitting the formatted received response to the recipient indicated in the response over the reply channel.

5. The method of claim 1, wherein the request comprises a structured query language (SQL) query transmitted with hypertext transfer protocol (HTTP) and checking the database comprises translating the request to a format compatible with the database.

6. The method of claim 1, wherein configuring hotspot information comprises configuring the database over the network with a browser.

7. The method of claim 1, wherein configuring hotspot information comprises configuring the database over the network with an enterprise resource planning (ERP) system.

8. The method of claim 1, wherein configuring hotspot information comprises:
   establishing a plurality of triggers for accumulated enterprise data; and
   triggering configuration of hotspot information in the database as a function of a trigger, the data in the hotspot information comprising selected portions of the accumulated enterprise data.

9. A method of mobile decision making, the method comprising:
   triggering dynamic configuration of hotspot information as a function of accumulated enterprise data, the hotspot information comprising a message, a response recipient selection list, a reply channel selection list, a portion of the accumulated enterprise data and a response information list;
   requesting the hotspot information with a mobile communication device;
   transmitting the hotspot information to the mobile communication device;
   configuring a response to the hotspot information with the mobile communication device through selection from the transmitted hotspot information of a recipient of the response, a reply channel and response information; and
   transmitting the response to the recipient with the reply channel.

10. The method of claim 9, wherein triggering dynamic configuration comprises establishing a plurality of key performance indicators as triggers.

11. The method of claim 9, wherein triggering dynamic configuration comprises configuring a record in a database with the hotspot information.

12. The method of claim 9, wherein triggering dynamic configuration comprises identifying a user to receive the hotspot information.

13. The method of claim 9, wherein requesting the hotspot information comprises checking for hotspot information addressed to a user of the mobile communication device.

14. The method of claim 9, wherein transmitting the hotspot information comprises transmitting the request over at least one of a wireless network, the Internet and a wireline network.

15. The method of claim 9, wherein transmitting the response comprises:
   updating a record in a database with the response; and
   accessing the database to format the response as a function of the reply channel.

16. The method of claim 9, wherein transmitting the response comprises updating the accumulated enterprise data as a function of the response.

17. The method of claim 9, wherein transmitting the response comprises dynamically configuring additional hotspot information as a function of the response.

18. A method of mobile decision making, the method comprising:
   generating a reoccurring request for hotspot information with a wireless mobile communication device, the request comprising login information of a user operating the wireless mobile communication device;
   transmitting the request over a network to a server computer, the server computer comprising a database;
   accessing the database to retrieve hotspot information as a function of the login information received with the request;
   transmitting dynamically configured hotspot information that is associated in the database with the login information to the wireless mobile communication device, the hotspot information comprising a message, a response template and data;

selecting, with the wireless mobile communication device, options provided by the server computer within the response template; and transmitting a dynamically configured response from the wireless mobile communication device to the server computer, the response configured as a function of the options selected from the response template.

19. The method of claim 18, further comprising the initial act of selectively configuring the database to provide data and a response template personalized to the needs of the user.

20. The method of claim 18, wherein transmitting the request comprises:

storing the requests when communication with the network is unavailable; and transmitting the stored requests when communication with the network is reestablished.

21. The method of claim 18, wherein selecting, with the wireless mobile communication device, options provided by the server computer comprises displaying the hotspot information with a graphical user interface as a function of a geographical location identified by the hotspot information.

22. The method of claim 18, wherein generating a reoccurring request for hotspot information comprises generating the reoccurring request on a predetermined schedule.

23. The method of claim 18, further comprising the initial act of downloading modules to the wireless mobile communication device as a function of the login information.

24. The method of claim 18, wherein generating a reoccurring request for hotspot information comprises formatting the request in structured query language (SQL).

25. The method of claim 18, wherein transmitting dynamically configured hotspot information comprises storing the hotspot information in the wireless mobile communication device.

26. The method of claim 18, wherein generating a reoccurring request for hotspot information comprises operating the wireless mobile communication device with Java 2 Platform, Micro Edition (J2ME).

27. A mobile decision support system for proactive decision support within an enterprise, the mobile decision support system comprising:

a server computer coupled with a network, the server computer comprising a database;

a client system coupled with the network, the client system operable to interface with the server computer and direct the configuration of hotspot information in the database, the hotspot information comprising identification of a specific user the hotspot information is for, a response template tailored for use by the identified specific user to formulate a response to the hotspot information and data;

a mobile communication device coupled with the network, the mobile communication device operable to request hotspot information from the server computer, the request including identification of the specific user operating the mobile communication device, wherein the server computer is operable to retrieve the hotspot information for the specific user from the database based on the identification of the specific user included in the request, and transmit the retrieved hotspot information over the network to the mobile communication device, wherein the mobile communication device is further operable to generate and transmit a response to the server computer as directed by the user, the response generated in accordance with selection by the user of a recipient of the response from the response template included in the hotspot information received by the mobile communication device.

28. The mobile decision support system of claim 27, wherein the response template comprises selection of a recipient of the response, a reply channel and response information.

29. The mobile decision support system of claim 27, wherein the server computer further comprises a response handler module, the response handler module operable to transmit the response to recipients dynamically selectable in the response as a function of the updated hotspot information, the response transmittable on a reply channel dynamically selectable in the response as a function of the updated hotspot information.

30. The mobile decision support system of claim 27, wherein the client system comprises an administrator client, the administrator client operable to configure hotspot information in the database via a browser, and at least one selection screen.

31. The mobile decision support system of claim 27, wherein the client system comprises an enterprise resource planning (ERP) system, the enterprise resource planning system operable to accumulate enterprise data and configure hotspot information as a function of the accumulated enterprise data and predetermined triggers.

32. The mobile decision support system of claim 27, wherein the mobile communication device comprises a watchdog module, a request module, a request handler module, a request change listener module and a user interface module, the request module and the watchdog module cooperatively operable to generate the requests, the request change listener module and the request handler module cooperatively operable to manage communication over the network.

33. The mobile decision support system of claim 27, wherein the mobile communication device comprises at least one of a wireless phone, a personal digital assistant and a pager operable with Java 2 Platform, Micro Edition (J2ME), communication over the network comprising communication over at least one of a wireless communication network and the Internet.

34. The method of claim 1, further comprising transmitting a response to the hotspot information over the network to the database as a function of the response template.

35. The mobile decision support system of claim 27, wherein the server computer further comprises a mediator module, the mediator module operable to translate a request received from the mobile communication device, retrieve hotspot information from the database as a function of the request, and update the hotspot information in the database as a function of the response transmitted from the mobile communication device.

* * * * *

UNITED STATES PATENT AND TRADEMARK OFFICE
CERTIFICATE OF CORRECTION

PATENT NO. : 7,895,336 B2
APPLICATION NO. : 10/094373
DATED : February 22, 2011
INVENTOR(S) : Richard Neill Cameron et al.

Page 1 of 1

It is certified that error appears in the above-identified patent and that said Letters Patent is hereby corrected as shown below:

In the Specification

Column 2, line 58 delete the second occurrence of "to the".

Column 4, line 63 delete "reestablishment" and insert --re-establishment--.

Column 14, line 45 delete "4-44" and insert --144--.

Signed and Sealed this
Tenth Day of May, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,895,336 B2 | Page 1 of 1 |
| APPLICATION NO. | : 10/094373 | |
| DATED | : February 22, 2011 | |
| INVENTOR(S) | : Cameron et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2676 days.

Signed and Sealed this
Twelfth Day of July, 2011

David J. Kappos
*Director of the United States Patent and Trademark Office*